Jan. 16, 1968 F. T. WATTS 3,363,859
AIRCRAFT
Filed May 18, 1961 6 Sheets-Sheet 1

Inventor
Frederick Thomas Watts
By
Attorney

Jan. 16, 1968  F. T. WATTS  3,363,859
AIRCRAFT

Filed May 18, 1961  6 Sheets-Sheet 3

Fig.4

Inventor
Frederick Thomas Watts
By
Ken W. Stocks
Attorney

Jan. 16, 1968   F. T. WATTS   3,363,859
AIRCRAFT

Filed May 18, 1961   6 Sheets-Sheet 4

Inventor
Frederick Thomas Watts
By
Attorney

Jan. 16, 1968 F. T. WATTS 3,363,859
AIRCRAFT
Filed May 18, 1961 6 Sheets-Sheet 6

United States Patent Office 3,363,859
Patented Jan. 16, 1968

3,363,859
AIRCRAFT
Frederick Thomas Watts, Knebworth, England, assignor to The De Havilland Aircraft Company Limited, Hatfield, England
Filed May 18, 1961, Ser. No. 111,089
Claims priority, application Great Britain, May 19, 1960, 17,626/60
22 Claims. (Cl. 244—42)

This invention relates to aircraft and in particular to aircraft wings.

In the design of aircraft wings, it has been proposed, in order to reduce the stalling speed, to provide an aircraft wing at its leading edge with a slat movable from a retracted position within a recess in the wing leading edge and upper surface to an operative position spaced in front of the wing leading edge to form a slot. Such a slat would be of aerofoil form, having a leading edge and a trailing edge, and in its operative position in flight would provide additional airflow to the upper surface to lower the stalling speed. In the design of wings for high speed aircraft, it has been found that wings, designed to have low drag at high speed, have a high stalling speed, which causes impracticably high landing speeds.

However, the use of slats, as described above, in high speed aircraft would present certain difficulties. Thin high speed wing aerofoil profiles require a low drooped operative position of the slat, which would be difficult to achieve with a linkage positioned within the profile. For high speed flight, airflow over the upper surface of the wing must not be spoilt as it would be by surface discontinuities or the gap at the trailing edge of the slat in the retracted position.

The areofoil forms of the slat and wing should be chosen freely and should be ideal, but they could not be so if, as necessary on a high speed wing, the wing nose and slat, in the retracted position, were to be arranged to present a continuous profile.

According to the invention, an aircraft wing has at its leading edge a slat hingedly mounted for movement from an operative position spaced in front of the wing leading edge to form a slot to a retracted position within a recess in the lower surface of the wing.

Preferably, the slat is supported for movement about a hinge axis adjacent the wing leading edge by hinge members extending from the slat trailing edge.

Hollow means may be provided for the transmission of de-icing fluid from the wing to the slat. In this case the fluid is, conveniently, hot air. The slat may have a double skin on the upper surface for the transmission of de-icing fluid therethrough.

With advantage, at least part of the exposed upper surface of the slat in the retracted position forms a continuation ofthe lower surface of the wing; the slat being of ideal aerofoil form in the operative position. In this case, there may be, at the rearward edge of the recess, a fairing flap arranged to form a continuation of the wing lower surface and to be withdrawn for slat movement to and from the recess.

Means to move the slat between its retracted and operative positions may include a lever pivoted in the wing and connected to the slat and to power means to pivot the lever.

The scope of the invention is defined by the appended claims; and how it can be carried into effect is hereinafter particularly described with reference to the accompanying drawings, in which:

Figures 1, 2:
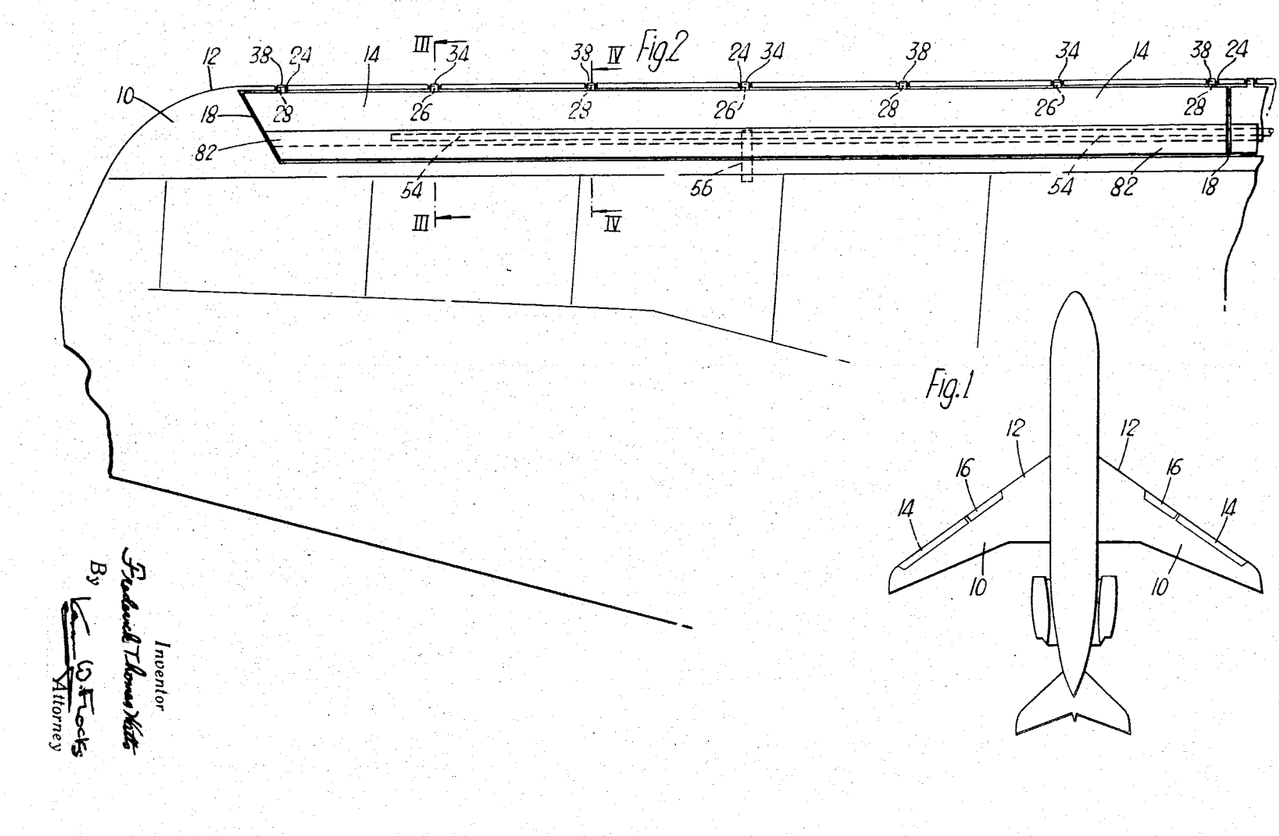
FIGURE 1 is a plan view from below of an aircraft having wings according to the invention.
FIGURE 2 is a view, to an enlarged scale, of part of one wing shown in FIGURE 1.

The aircraft (FIGURE 1) has a pair of wings 10, each of which has, at its leading edge 12, a pair of retractable slats 14 and 16. The slats 14 and 16 are interconnected and form as it were a single slat divided at one plane in its transverse length so that the outboard slat 14 is approximately 50% longer than inboard slat 16. Each slat is hingedly mounted for movement from an operative position spaced in front of the wing leading edge 12 to form a slot as shown in chain dotted lines in FIGURE 3 to a retracted position within a recess 18 in the lower surface of the wings, as shown in full lines in FIGURE 3.

As the slats are basically similar and differ only in length and number of hinge members, only one slat is shown in detail and will be described hereinafter.

The slat 14 and slat operating mechanism are located forward of a transverse spar 20 in the aircraft wing 10 and in the region of the slat upper surface 22 of the wing extends forward of the spar 20 over the slat and slat operating mechanism as a smooth uninterrupted continuation of the remainder of the wing upper surface.

At seven locations (FIG. 2) the leading edge 12 of the wing 10 is indented to form hinge ports 24 in which transverse hinge pins 26 and 28 are mounted between longitudinal side plates 30. Three hinge pins 26 are solid and four pins 28 are hollow and connected to a hot air de-icing system on the aircraft. The ports 24 do not extend to any substantial extent into the upper surface 22 of the wing, but form upward extensions of the recess 18 in the lower surface of the wing 10 forward of the spar 20.

Figure 3:
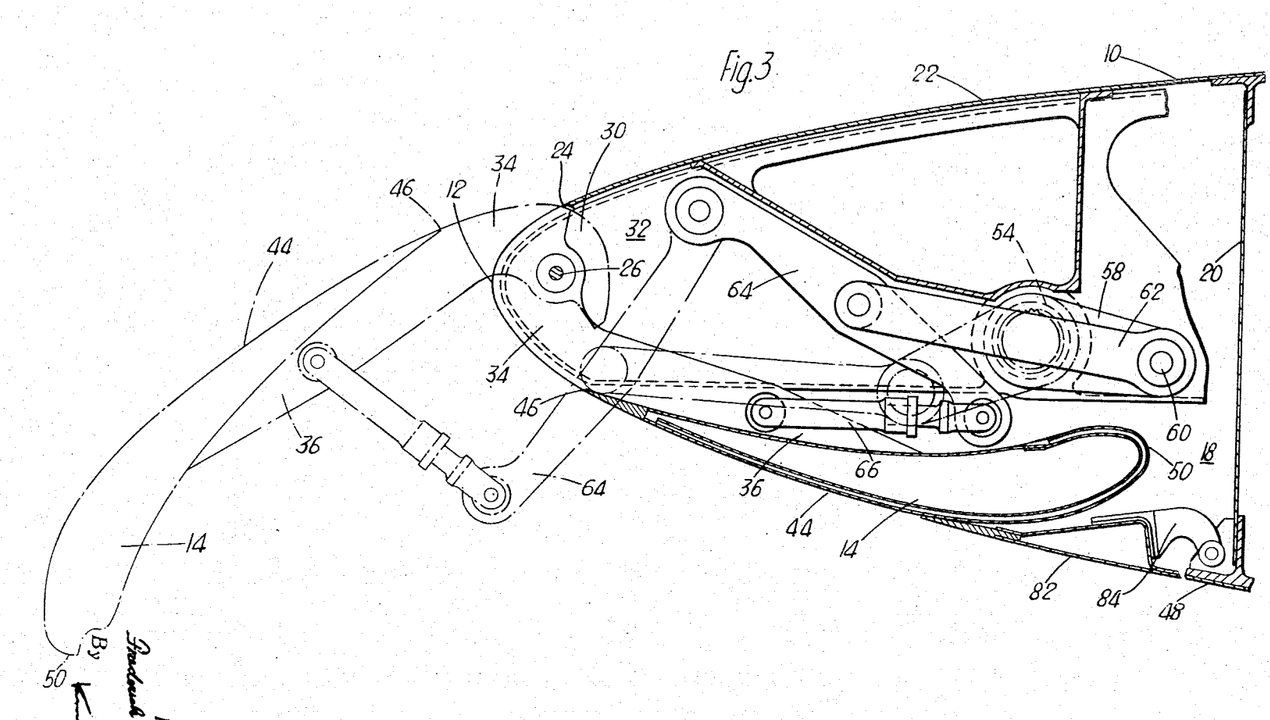
FIGURES 3 and 4 are sections on the lines III—III and IV—IV respectively in FIGURE 2 of the forward part of the wing with movable parts shown in alternative positions.

Above the recess 18 the wing 10 is formed in the usual way with ribs, spars and beams to support the wing upper surface 22, the slat and slat operating mechanism. Behind each port 24 for a solid hinge pin 26 is a narrow pocket 32 between extensions of the longitudinal side plates 30, which pocket communicates with the recess 18 (FIG. 3). On each solid hinge pin 26 is pivoted a hinge member 34 whose hinge pin end has an external form corresponding to the leading edge profile. The hinge member 34 has an arm 36 extending from the hinge pin end into the recess 18.

Figure 4:
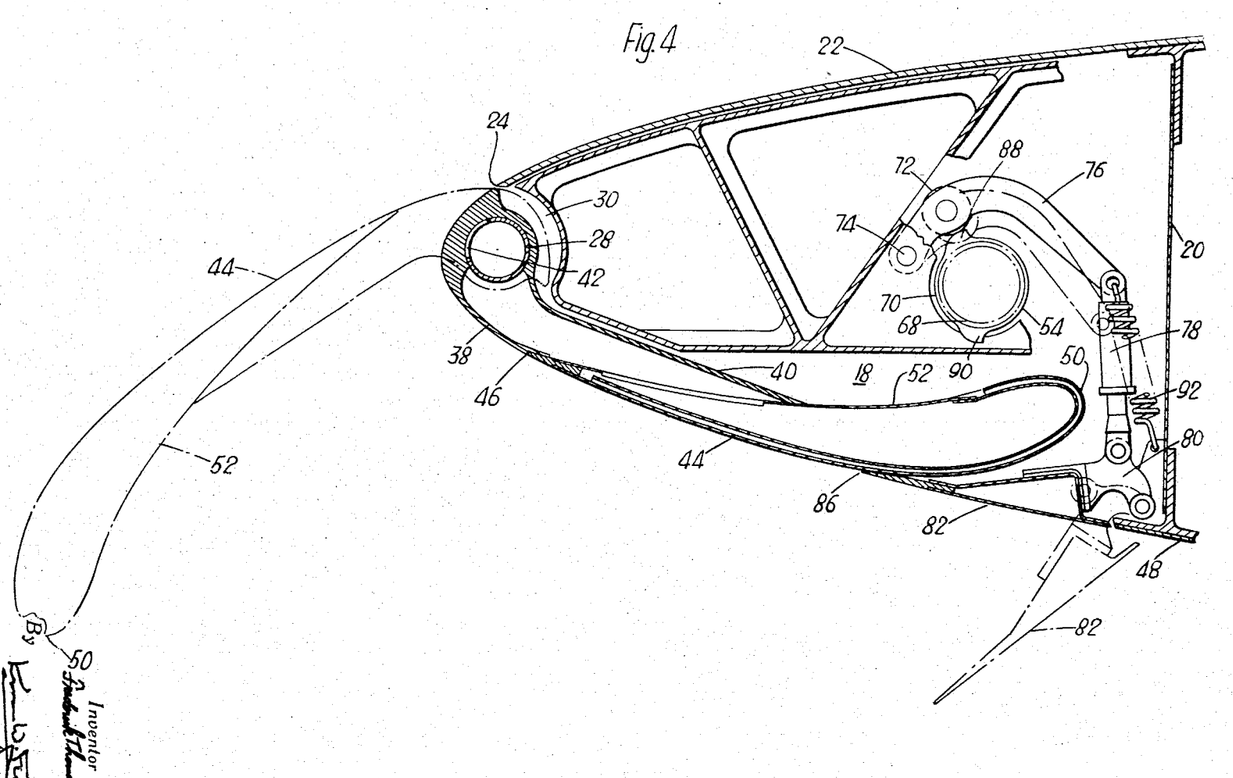

A hinge member 38 of similar external form is pivoted on each hollow hinge pin 28 but has a hollow arm 40 communicating with the interior of the hinge pin 28 through radial ports 42. The hinge members 34 and 38 are rigidly connected to the slat which is of aerofoil section and hollow (FIG. 4). The interior of hollow hinge members 38 communicates with the hollow interior of the slat through the arms 40. It will be understood that the hinge members 34 and 38 constitute means maintaining the slat 14, during turning of the slat about the hinge pins 26, 28, so that its trailing edge 46 is always adjacent the leading edge 12 of the wing while the slat leading edge 50 is always remote from said wing leading edge.

In the retracted position (FIG. 3), the slat 14 is upside down within the recess 18 and part of its upper surface 44 from the trailing edge 46 forms a continuation of the lower surface 48 of the wing. The slat 14 has a double skin on the upper surface 44 (FIG. 4) extending from the trailing edge, around the leading edge 50 to a position towards the front of the lower surface 52. The interior of the hollow skin communicates with the interior of the slat adjacent the trailing edge 46 and with atmosphere at the lower surface 52.

The slat operating mechanism includes a torque tube 54 extending transversely of the wing 10 and is located forward of the spar 20 just above the recess 18. The torque tube 54 is connected to an hydraulic jack 56 so as to be angularly movable thereby through an angle of approximately 140°. The transverse torque tube is splined to the big end of a crank arm 58 which is carried in bearings in a longitudinal sideplate 30 of a pocket 32 and is linked by a crank pin 60 to a similar crank arm carried in bearings in the other side plate 30 of the pocket. The transverse torque tube 52, is in sections connected by the crank arms 58 and crank pins 60.

In one end position (the retracted position) of the torque tube 54, the crank arms 58 extend rearwardly from the torque tube and a link 62 journalled on the crank pin 60 extends forwardly between the crank arms 58. The crank arms and link form a toggle which is just past top dead centre in the restricted position. The end of the link 62 is bifurcated and is pivotally connected to a lever 64 intermediate its ends. The lever 64 is pivoted to the wing structure just below the upper surface 22 and behind the leading edge 12. The lever 64 in the retracted position lies in the pocket 32 and its free end extends into the recess 18 where it is connected by an adjustable link 66 to the hinge member arm 36.

In the other end position (the operative position) of the torque tube 54, the crank arms 58 extend forwardly and the lever 64 extends forwardly and downwardly outside the aircraft wing envelope, the slat 14 being spaced from the wing leading edge 12 to form a slot. In this position, the crank arms 58 and link 62 are nearly fully extended and are approaching their bottom dead centre position.

The torque tube 54 also carries cams 68 (FIG. 4), each having a peripheral cam surface 70 on which runs a roller 72 carried near its pivot 74 by a pivoted arm 76 whose free end is connected by an adjustable link 78 to a bracket 80 hinged to the wing just forward of the spar 20 and above the wing lower surface 48. The bracket 80 carries a fairing flap 82 which is also carried by other unconnected hinged brackets 84 (FIG. 3).

The fairing flap 82 extends for the transverse length of the slat 14 and in one closed position, shown in full lines in FIG. 4, forms a continuation of the wing lower surface 48 having a forward edge 86 to engage the slat upper surface 44. At its rearward edge, the flap fits closely to the wing lower surface. By pivotation of the hinged brackets 80 the fairing flap 82 can be withdrawn from the recess 18 and the path of the slat 14 so as to extend downwardly and forwardly from the wing lower surface 48 in an open position, shown in chain dotted lines in FIG. 4.

Each cam on the torque tube 54 has two lifts 88 and 90 engaged by the roller 72 at the end positions of the torque tube 54 and with the roller 72 on a lift 88 or 90 the fairing flap 82 is held in the closed position. Between the lifts 88 and 90 the cam surface 70 is such as to permit movement of the flap 82 to the open position.

The pivoted arm 76 is urged by a spring 92 to hold the roller 72 on the cam surface 70 and thus to pivot the hinged bracket 80 to extend the fairing flap 82 to the open position unless the roller 72 is on a lift 88 or 90.

During high speed flight of the aircraft, the slat 14 is held in the retracted position and the fairing flap 82 in the closed position by the torque tube 54 which is in the retracted end position.

If it is desired to lower the stalling speed, for example on landing, the torque tubes for the slats on each wing are moved angularly by the hydraulic jacks. Considering one slat only, initial angular movement of the torque tube 54 causes the cam lift 88 to move away from the roller 72 on the pivoted arm 76 to allow the spring 92 to move the fairing flap 82 to the open position.

The crank arms 58 are rotated to push the pivoted lever 64 by means of the link 62 away from its retracted position carrying with it the slat 14. Continued angular movement of the torque tube 54 causes movement of the slat 14 to the operative position in which its chord line makes an angle with the chord line of the wing such that the optimum reduction in stalling speed may be achieved. As the torque tube 54 reaches the operative end position, the second cam lift 90 engages the roller 72 and pivots the pivoted arm 76 against the spring 92 to move the fairing flap 82 to the closed position and thus to reduce drag.

In the operative position, the slat 14, the trailing edge of which does not project substantially above the leading edge of the wing, causes a flow of air from a region of high pressure below the slat through the slot to a region of low pressure above the wing which, by delaying separation on the upper surface to a high wing incidence, reduces the stalling speed.

If de-icing is needed while the slat 14 is in the operative position, hot air is blown through the hollow hinge pins 28 and hinge members 38 into the slat 14, whence it passes under the upper surface 44, and around the leading edge 50, being discharged below the lower surface 52 and passing through the slot.

The operation is reversed to return the slat 14 to its recess 18.

The upper surface of the wing is not spoilt by profile irregularities nor broken by gaps as would be the case if the recess were to be in the upper surface. The avoidance of such gaps and irregularities is of more importance in high speed flight than the avoidance of similar gaps and irregularities in the lower surface.

In the operative position, the slat 14 is subject to low pressure on the upper surface which tends to hold it in this position. If a driving jack or lever failure occurred, this low pressure would tend to draw the slat further from the wing, but as the toggle formed by the crank arms 58 and link 62 is nearly fully extended, little or no movement of the slat is permitted. In the retracted position, the toggle being over top dead centre, failure of the driving jack or lever would not permit the slat to be withdrawn from the recess by high speed dynamic conditions in which suction exists at the lower surface. Accordingly in passage between the operative and retracted positions, the slat will, upon a driving jack or lever failure, move to the operative position or to a slightly trailing position. At the same time the spring will hold the fairing flap in open position in case the slat moves to its retracted position.

Other driving means, for example electric motors, may be used to move the slat operating linkage and the numbers and dispositions of the slats and hinges may be varied.

Figure 5:
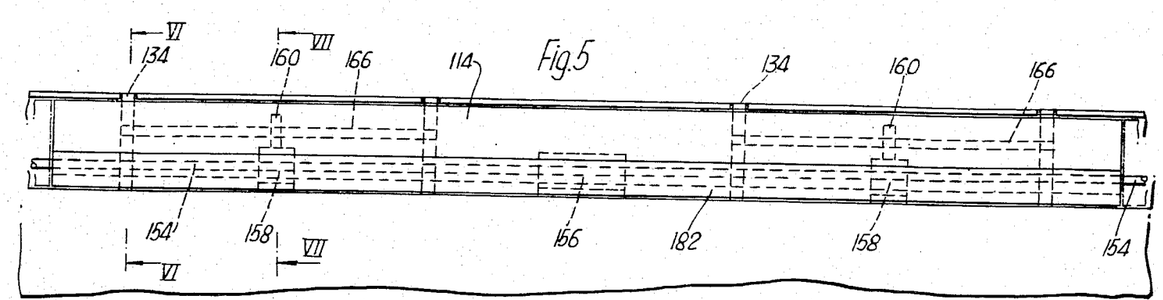
FIGURE 5 is a view, to an enlarged scale, of part of another embodiment of aircraft wing according to the invention.

In a second embodiment of aircraft wing, the slat 114 (FIGURE 5) is one of three retractable slats at the leading edge of an aircraft wing. As the slats are basically similar and differ only in length and number of hinge members, only one slat is shown in detail and will be described hereinafter. The slat is hingedly mounted for movement from an operative position spaced in front of the wing leading edge to form a slot as shown in full lines in FIGURE 6 to a retracted position within a recess in the lower surface of the wing, as shown in full lines in FIGURE 7.

The slat 114 and slat operating mechanism are located forward of a transverse spar 120 in the aircraft wing and in the region of the slat the upper surface 122 of the wing extends forward of the spar 120 over the slat and slat operating mechanism as a smooth uninterrupted continuation of the remainder of the wing upper surface.

At four locations (FIGURE 5) the leading edge of the wing is indented to form hinge ports in which transverse hinge pins 126 are mounted between longitudinal side plates of the ports. The ports do not extend to any substantial extent into the upper surface 122 of the wing, but form upward extensions of the recess in the lower surface of the wing forward of the spar 120.

Above the recess the wing is formed in the usual way with ribs, spars and beams to support the wing upper surface 122, with slat and slat operating mechanism. On each hinge pin 126 is pivoted a hinge member 134 whose hinge pin end has an external form corresponding to the leading edge profile. Each hinge member 134 has an arm 136 extending from the hinge pin end into the recess and rigidly connected to the slat 114 which is of aerofoil section.

Figures 8, 9:
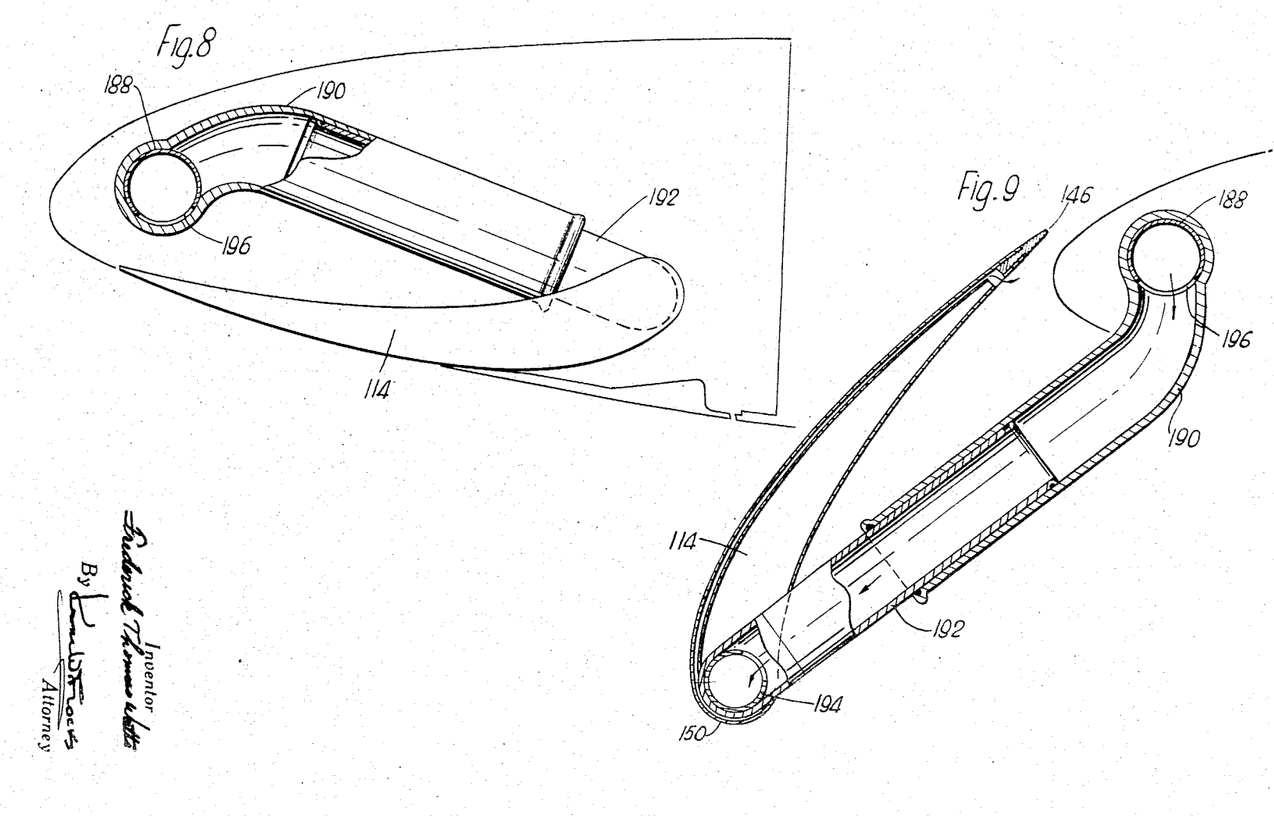
FIGURES 8 and 9 are diagrammatic sectional views with the slat in different positions and showing de-icing means for the slat.

In the retracted position (FIGURE 6), the slat 114 is upside down within the recess and part of its upper surface 144 from the trailing edge 146 forms a continuation of the lower surface 148 of the wing. The slat 114 has a double skin on the upper surface 144 (FIGURE 9) extending around the leading edge 150 to a position near the trailing edge 146. The interior of the hollow skin communicates with the interior of the slat adjacent the leading edge 150 and with atmosphere near the trailing edge 146.

The slat operating mechanism includes a torque shaft 154 extending transversely of the wing and located forward of the spar 120. The torque shaft 154 is connected to be driven by an hydraulic motor 156 so as to be rotatable thereby. The transverse torque shaft is connected through bevel gears (not shown) to drive through irreversible clutches 158 (FIGURE 7) worm shafts 160 extending forwardly and inclined slightly downwardly. Each worm shaft 160 carries a ball nut 162 which has a trunnion connection to a crank arm 164 carried by a transverse torque tube 166 extending between between two hinge members.

Adjacent each hinge member, each torque tube 166 carries a lever 168 (FIGURE 6) whose free end is connected by an adjustable link 170 to the hinge member arm 136. The torque tube 166 is angularly movable by the nut 162 due to rotation of the worm shaft through about 90°. In the operative position of the torque tube 166 (shown in full lines in FIGURE 6), the lever 168 extends downwardly outside the aircraft wing envelope, the slat 114 being spaced from the wing leading edge to form a slot. In this position, an extension 172 on and inclined to the link 170 engages a fixed portion of the wing.

Figure 6:
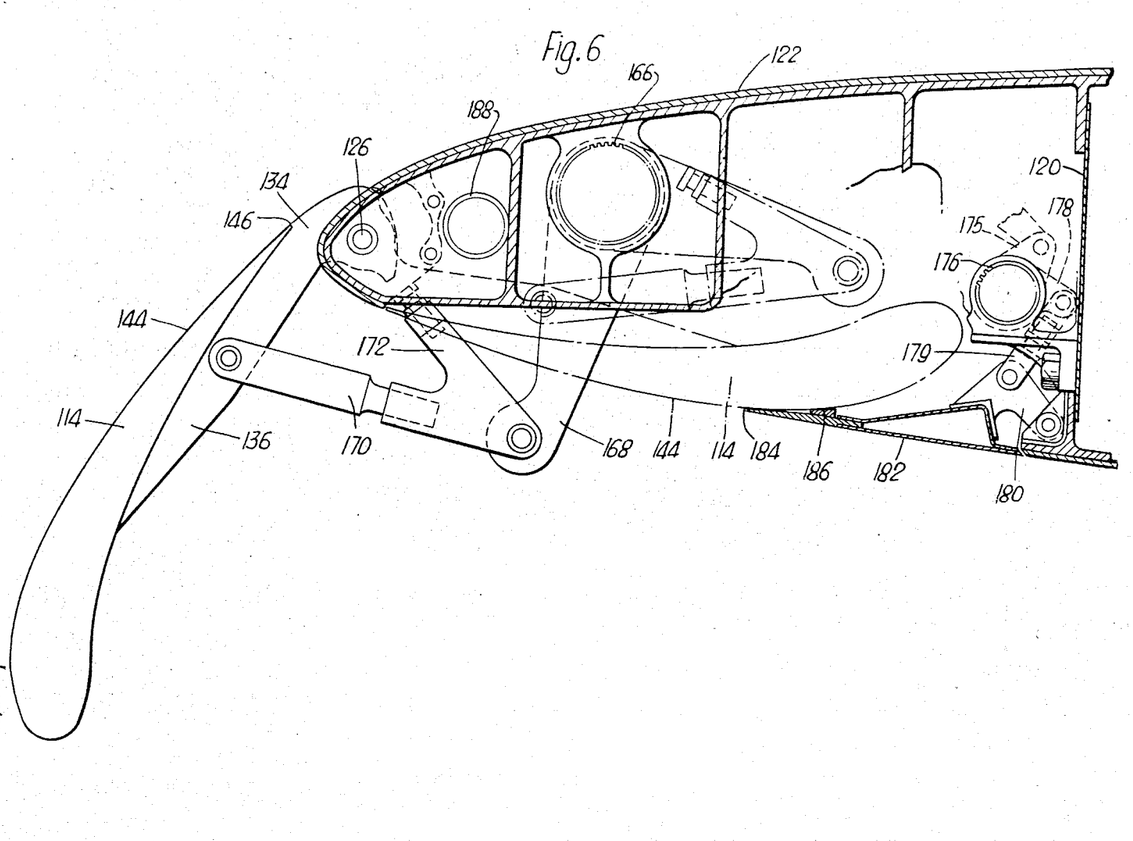
FIGURES 6 and 7 are sections on the lines VI—VI and VII—VII respectively in FIGURE 5 of the forward part of the wing with movable parts shown in alternative positions.
Figure 7:
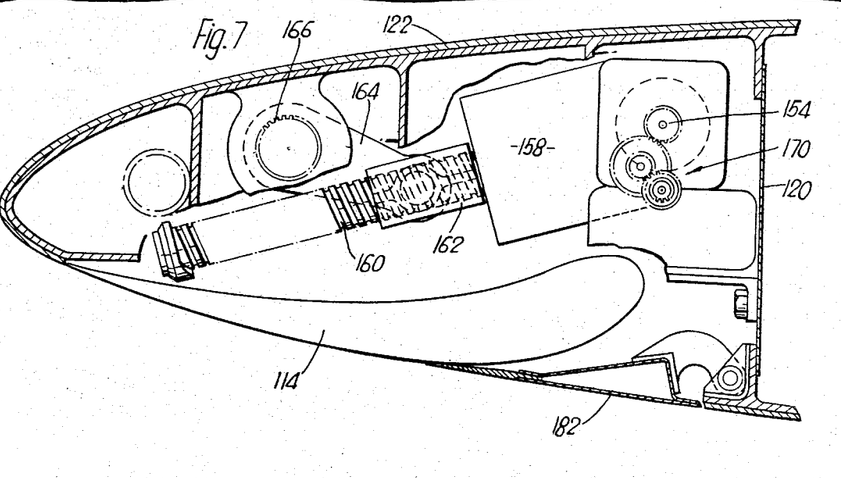

The torque shaft 154 also drives through a train of gears 174 (FIGURE 7) a cam (not shown). The cam is similar to that shown in FIGURE 4 but has only a single lift, and is operatively connected by a spring-urged roller-carrying pivoted arm (similar to that shown in FIGURE 4) to a crank 175 (FIGURE 6) on a torque tube 176 (FIGURE 6). The tube 176 carries a crank 178 whose free end is connected by an adjustable link 179 to a bracket 180 hinged to the wing just forward of the spar 120 and above the wing lower surface 148. The bracket 180 carries a fairing flap 182 which is also carried by other unconnected hinged brackets (not shown).

The fairing flap 182 extends for the transverse length of the slat 114 and in the closed position shown forms a continuation of the wing lower surface 148 having a forward edge 184 to engage the slat upper surface 144. The flap 182 also carries a pad 186 of a material having a low coefficient of friction such as polytetrafluoroethylene, with which its upper surface engages the surface 144. At its rearward edge, the flap fits closely to the wing lower surface. By pivotation of the hinged brackets 180 the fairing flap 182 can be withdrawn from the recess and the path of the slat 114 so as to extend downwardly and forwardly from the wing lower surface in an open position (not shown).

The gear train 174 is such as to cause the cam to rotate nearly once whilst the torque tube 166 moves between its end positions. The torque tube 176 is thus rocked to move the fairing flap 182 from the closed position to the open position and back again. The lift may be of two heights so that, with the tube 166 in the operative position, the flap is withdrawn further into the recess than shown to engage a fixed part of the wing with its forward edge 184.

Forward of the torque shafts 166 and behind the hinge pins 126, a tube 188 extends transversely along the wing and is perforated at intervals to supply hot air for de-icing to the wing leading edge. For each slat, a telescopic connector tube connects the tube 188 to the slat. The telescopic connector tube is in two parts, a cranked female portion 190 (FIGURES 8 and 9) pivoted on the tube and a male portion 192 pivoted on a tube 194 extending across the slat in the vicinity of the leading edge. The tube 194 is perforated throughout its length to communicate with the interior of the leading edge and thence with the interior of the double skin of the slat. With the slat in the retracted position (FIGURE 8), the portion 192 of the telescopic connector tube slides into the portion 190 and they extend rearwardly from the tube 188 and lie within the wing. The tube 188 has a valve port 196 which is closed by the portion 190 in this position. With the slat in the operative position (FIGURE 9), the telescopic connector tube is extended and does not lie across the narrow part of the slot between the slat and the wing leading edge. In this position, the valve port 196 is open and the interior of the tube 188 connects with the interior of the portion 190.

During high speed flight of the aircraft, the slat 114, is held in the retracted position as the torque tube 166 cannot rock, due to the irreversible clutch 158.

If it is desired to lower the stalling speed, for example on landing, the torque shaft 154 for the slats on each wing is rotated by the hydraulic motor 156. Considering one slat only, initial rotation of the torque shaft 154 causes the torque tube 176 to rock and as the crank arm 178 lies normal to the link 179 the fairing flap 182 is moved rapidly to the open position.

The worm shafts 160 are rotated and the nuts 162 move forward to rock the arms 164 and torque tubes 166. The latter rock the levers 168 and links 170 so that the slat 114 is moved away from its retracted position to the operative position in which its chord line makes an angle with the chord line of the wing such that the optimum reduction in stalling speed may be achieved. As the torque shaft 166 reaches the operative end position, the tube 176 is rocked back again so that the fairing flap 182 is returned to the closed position to reduce drag. If the cam lift has two heights, the flap 182 may then be inclined upwardly into the recess to avoid an accumulation of ice therein in icing conditions.

In the operative position, the slat 114 causes a flow of air from a region of high pressure below the slat through the slot to a region of low pressure above the wing which, by delaying separation on the upper surface to a high wing incidence, reduces the stalling speed.

If de-icing is needed, hot air is blown through the tube 188, the telescopic tube portions 190 and 192 and the tube 194 into the slat 114, whence it passes into the double skin around the leading edge 150 and under the upper surface 144, being discharged at a position towards the trailing edge 146.

The operation is reversed to return the slat 114 to its recess.

As explained above, the upper surface of the wing is not spoiled by profile irregularities nor broken by gaps as would be the case if the recess were to be in the upper surface.

In the operative position, the slat 114 is subject to low pressure on the upper surface which tends to hold it in this position. If a driving motor, screw jack or lever failure occured, this low pressure would tend to draw the slat further from the wing, but as the stop extension 172 is engaged with a fixed portion of the wing so no movement of the slat is permitted. In the retracted position, the fairing flap pad 186 engages the slat 114, and cam action holds the fairing flap locked so that the slat is not withdrawn from the recess, upon driving motor failure, by high speed dynamic conditions in which suction exists at the lower surface.

The de-icing connector tube portions 190 and 192 lie in an area of comparatively low speed air and this minimises the air disturbance through the slot.

The hinge members 134, being shaped to the wing section in the retracted position, cause a disturbance of the air passing at high speed through the slot in the operative position. Air may be taken from the double skin through the trailing edge 146 in the vicinity of the hinge members to obviate this difficulty.

To hold the fairing flap in the closed position, use may be made of an irreversible gear train of high reduction ratio. The fairing flap may be arranged for inward withdrawal.

I claim:

1. An aircraft wing having an upper surface, a leading edge and a lower surface with a recess in the lower surface behind the leading edge, including a slat, a member fixed to said slat and pivoted at the wing leading edge for movement of said slat from an operative position spaced in front of the wing leading edge to form a slot to a retracted position upside down within the recess with part of the surface of said slat forming a continuation of the lower surface of the wing and a fairing flap pivoted to said wing at the rear of said recess and movable to permit said slat to be disposed with a part of said slat overlying the said lower surface at the rear of the recess therein.

2. An aircraft wing having an upper surface, a leading edge and a lower surface with a recess in the lower surface behind the leading edge, including a slat pivotally mounted at the wing leading edge with a leading edge and a trailing edge, and pivot members fixed to the slat trailing edge, by which the slat is supported for movement about a pivot axis adjacent the wing leading edge for movement from an operative position spaced in front of the wing leading edge to form a slot to a retracted position upside down within the recess with part of the surface of said slat forming a continuation of the lower surface of the wing and a fairing flap pivoted to said wing at the rear of said recess and movable to permit said slat to be disposed with a part of said slat overlying the said lower surface at the rear of the recess therein.

3. An aircraft wing as claimed in claim 2, wherein at least one of the hinge members is hollow for the transmission of de-icing fluid from the wing to the slat.

4. An aircraft wing as claimed in claim 3, wherein the slat has a double skin on the upper surface for the transmission of de-icing fluid therethrough.

5. An aircraft wing as clamied in claim 4, wherein the double skin extends from the slat trailing edge around the leading edge to the slat lower surface for the exhaust of de-icing air under the lower surface to the slot in the operative position.

6. An aircraft wing having an upper surface, a leading edge and a lower surface with a recess in the lower surface behind the leading edge, including a slat, a member fixed to said slat and pivoted at the wing leading edge for movement of said slat from an operative position spaced in front of the wing leading edge to form a slot to a retracted position upside down within the recess, said slat having an exposed surface in the retracted position, part of which forms a continuation of the lower surface of the wing, and a fairing flap at the rearward edge of the recess arranged to form a continuation of the wing lower surface and means to withdraw the flap for slat movement to and fro from the recess.

7. An aircraft wing having an upper surface, a leading edge and a lower surface with a recess in the lower surface behind the leading edge, including a pivotal mounting member pivoted substantially at the wing leading edge, a slat fixed to said pivotal mounting member for pivotal movement therewith, a lever system having a lever separate from said pivotal mounting member and swingable about a fixed pivot within the recess and connected to the slat at a point spaced from its pivot point, said lever pivot being likewise spaced from the pivot point of said member and power means connected to the lever to pivot the lever to move the slat between a retracted inoperative position upside down within the recess and an operative position in which the trailing edge of the slat does not project substantially above the leading edge of said wing and the slat extends forwardly and downwardly from, and is spaced in front of, the wing leading edge to form a slot defined by said slat and said wing leading edge.

8. An aircraft wing as claimed in claim 7, wherein the power means includes a rotary member and a crank connected to the lever.

9. An aircraft wing as claimed in claim 8, including a link which with the crank forms a toggle between the rotary member and the lever, which toggle in the retracted position of the slat is on or past top dead centre.

10. An aircraft wing as claimed in claim 9, wherein in the operative position of the slat, the toggle is adjacent bottom dead centre.

11. An aircraft wing having an upper surface, a leading edge and a lower surface with a recess in the lower surface behind the leading edge, including a slat at the wing leading edge hingedly mounted for movement from an operative position spaced in front of the wing leading edge to form a slot to a retracted position upside down within the recess, said slat having an exposed surface in the retracted position, part of which forms a continuation of the lower surface of the wing, a fairing flap hinged at the rearward edge of the recess and arranged to form a continuation of the wing lower surface, a rotary member mounted transversely in the wing, a lever pivoted in the wing and connected to the slat, a crank on said rotary member operatively connected to the lever, a cam having a cam surface connected to be driven by the rotary member, a linkage connected to the fairing flap, a roller carried by the linkage and held in engagement with the cam surface, and power means to rock said rotary member to cause coordinated movement of the slat and fairing flap.

12. An aircraft wing as claimed in claim 11, wherein the cam surface has two portions which when engaged by the roller cause the fairing flap to be held in its closed position, said portions being separated by a portion which when engaged by the roller causes the fairing flap to move.

13. An aircraft wing as claimed in claim 1, including hollow means for the transmission of de-icing fluid from the wing to the slat.

14. An aircraft wing as claimed in claim 13, wherein said hollow means comprises a telescopic tubular member whose ends are pivotally mounted within the slat leading edge and within the wing nose.

15. An aircraft wing as claimed in claim 7, wherein the power means includes a rotary member operatively connected to rotate the screw shaft of a screw and nut jack, whose nut is connected by a crank to the pivoted lever.

16. An aircraft wing as claimed in claim 15, including an irreversible clutch between the screw shaft and rotary member.

17. An aircraft wing having an upper surface, a leading edge and a lower surface with a recess in the lower surface behind the leading edge, including a slat hingedly mounted at the wing leading edge for movement from an operative position spaced in front of the wing leading edge to form a slot to a retracted position upside down within the recess, said slat having an exposed surface in the retracted position, part of which forms a continuation of the lower surface of the wing, and a fairing flap at the rearward edge of the recess, arranged to form a continuation of the wing lower surface and means to withdraw the flap for slat movement to and fro from the recess.

18. A primary lift producing member having an upper surface, a leading edge portion and a lower forward surface portion thereof and an auxiliary member fixed to another member pivoted to said lift producing member at a location adjacent to said leading edge portion and having an auxiliary member first edge adjacent to said leading edge portion and an auxiliary member second edge remote from said leading edge portion, means maintaining said auxiliary member first edge adjacent to said leading edge portion and said auxiliary member second edge permanently more remote from said leading edge portion during turning of said auxiliary member about said pivot location, and means provided to turn said auxiliary member with respect to said lift producing member about said pivot location between a first position in which said auxiliary member is adjacent to the lower forward surface portion of said lift producing member, and a second position in which said auxiliary member is in front of said leading edge portion of said lift producing member and substantially wholly below said upper surface with said second edge ahead of and below said first edge, and in which the surface of said auxiliary member adjacent to its first edge is spaced from said leading edge portion of said lift producing member to define the wall surfaces of a slot between said auxiliary member and said lift producing member to provide gaseous flows across said slot.

19. An aircraft wing having an upper surface, a leading edge portion and a lower forward surface portion thereof, a slat fixed to a member pivoted to said wing at a location adjacent to said leading edge portion and having a slat first edge adjacent to said leading edge portion and a slat second edge remote from said leading edge portion, means maintaining said slat first edge adjacent to said leading edge portion and said slat second edge more remote from said leading edge portion during turning of said slat about its pivot and fluid-pressure-operated means provided to turn said slat with respect to said wing about said pivot between a first position in which said slat is adjacent to the lower forward surface portion of said wing with said first edge of said slat leading, and a second position in which said slat is in front of said leading edge portion of said wing with said second edge of said slat leading, and in which the surface of said slat adjacent to its first edge is spaced from said leading edge portion of said wing to define the wall surfaces of a slot between said slat and said wing to provide air flow across said slot.

20. A primary lift producing member having an upper surface, a leading edge and a lower surface and an auxiliary lift producing member fixed to another member pivoted to said primary member substantially at said leading edge with said auxiliary member having a first spanwise edge substantially parallel and adjacent to said leading edge, a second spanwise edge generally parallel to said first spanwise edge and more remote from said leading edge, and surfaces between said first and second spanwise edges, means maintaining said first spanwise edge adjacent to said leading edge and said second spanwise edge permanently more remote from said leading edge during turning of said auxiliary member about its pivot, and means provided to turn said auxiliary member about its pivot between a high speed position in which said auxiliary member is below said upper surface and is adjacent to and faired with said lower surface with said second edge trailing said first edge, and a slow speed high lift position in which said auxiliary member is positioned substantially in front of said leading edge and inclined at a substantial angle to said lower surface with said second edge ahead of and below said first edge and said leading edge, and with the lower surface of said auxiliary member in said high lift position spaced from the surface portions of said primary member adjacent to said leading edge to define the walls of an upwardly and rearwardly contracting slot therebetween having a minimum slot cross-sectional area at a location adjacent to said first edge, for smooth upward and rearward fluid flow therethrough from below said primary lift producing member to above said primary lift producing member.

21. A primary lift producing member having an upper surface, a leading edge and a lower surface and an auxiliary lift producing member fixed to a bracket pivoted to said primary member adjacent to said leading edge with said auxiliary member having a streamlined body having a first spanwise edge substantially parallel to said leading edge, a second spanwise edge generally parallel to said first spanwise edge, and surfaces between said first and second spanwise edges, and means provided to move said auxiliary member between a high speed position in which said auxiliary member is below said upper surface and is adjacent to and faired with said lower surface with said first edge adjacent to said leading edge and said second edge trailing said first edge, and a slow speed high lift position in which said auxiliary member is positioned substantially in front of said leading edge and inclined at a substantial angle to said lower surface with said second edge ahead of and below said first edge and said leading edge, and with the lower surface of said auxiliary member in said high lift position spaced from the surface portions of said primary member adjacent to said leading edge to define the walls of an upwardly and rearwardly contracting slot therebetween having a minimum slot cross-sectional area at a location adjacent to said first edge, for smooth upward and readward fluid flow therethrough from below said primary lift producing member to above said primary lift producing member.

22. In an airplane, an airfoil having a plurality of nose slots in its leading edge and a spanwise recess in its underside extending generally parallel to the leading edge adjacent the airfoil nose portion, a slat of airfoil shape mounted to pivot about the forward portion of said airfoil between a retracted position within said recess thereby to form a generally smooth contour with the adjacent underlying surface of the airfoil and an extended position with the slat spaced forwardly of the airfoil leading edge to define therewith a spanwise slot, and means for moving said slat into and out of retracted and extended positions, said means comprising a plurality of spaced apart support members carrying said slat in its pivotal movement each fixedly secured at one end to the slat near the slat trailing edge and at the other end pivoted to the airfoil nose portion for passage through one of said nose slots during said pivotal movement, said support members in slat extended position extending forwardly of the wing leading edge and in slat retracted position effecting nose slot closure and forming a smooth contour with the adjacent outer surface portions of the airfoil nose, over-center locking linkages operably connected to said support members each comprising a first arm mounted upon said airfoil for pivotal movement, a second arm pivotally connected to said first arm and pivotally connected to a said support member, and means for driving said first arm in rotation to move said airfoil by means of said second arm into and out of said extended and retracted positions, said first and second arms in said airfoil retracting position being locked over-center.

References Cited

UNITED STATES PATENTS

| 1,631,259 | 6/1927 | Gilmore | 244—42 |
| 1,880,019 | 9/1932 | Harper | 244—42 |
| 2,157,281 | 5/1939 | Coanda | 244—42.41 |
| 2,187,506 | 1/1940 | Van Daam | 244—134 |
| 2,941,751 | 6/1960 | Gagarin | 244—42.41 |
| 2,990,140 | 6/1961 | Mazelsky | 244—42 |
| 3,089,666 | 5/1963 | Quenzler | 244—42 X |

FOREIGN PATENTS

| 850,509 | 9/1939 | France. |
| 1,011,175 | 4/1952 | France. |
| 459,730 | 1/1937 | Great Britain. |

FERGUS S. MIDDLETON, *Primary Examiner.*

EMILE PAUL, MILTON BUCHLER, *Examiners.*

B. BELKIN, *Assistant Examiner.*